(12) United States Patent
Perveyrie et al.

(10) Patent No.: US 9,738,235 B2
(45) Date of Patent: Aug. 22, 2017

(54) DEVICE FOR MOUNTING A UNIT, NOTABLY A RADIO, IN A MOTOR VEHICLE INSTRUMENT PANEL COMPARTMENT

(71) Applicant: RENAULT S.A.S., Boulogne-Billancourt (FR)

(72) Inventors: Sylvie Perveyrie, Guyancourt (FR); Michel Bougault, Bougival (FR); Alain Dagoreau, La Garenne Colombes (FR); Laurent Perrin, Versailles (FR); Isabelle Prin, Orsay (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 242 days.

(21) Appl. No.: 14/385,304

(22) PCT Filed: Jan. 31, 2013

(86) PCT No.: PCT/EP2013/051919
§ 371 (c)(1),
(2) Date: Oct. 7, 2014

(87) PCT Pub. No.: WO2013/135421
PCT Pub. Date: Sep. 19, 2013

(65) Prior Publication Data
US 2015/0034774 A1  Feb. 5, 2015

(30) Foreign Application Priority Data
Mar. 14, 2012 (FR) ..................... 12 52294

(51) Int. Cl.
*B60R 11/00* (2006.01)
*B60K 37/04* (2006.01)
*B60R 11/02* (2006.01)

(52) U.S. Cl.
CPC .......... *B60R 11/0205* (2013.01); *B60K 37/04* (2013.01); *B60K 2350/941* (2013.01);
(Continued)

(58) Field of Classification Search
CPC .............. B60K 37/04; B60K 2350/941; B60R 11/0205; B60R 2011/0005; B60R 2011/0042; B60R 2011/0047
(Continued)

(56) References Cited

U.S. PATENT DOCUMENTS 5,560,572 A * 10/1996 Osborn ................ H05K 7/1421
248/201
6,416,025 B1 * 7/2002 Urrutia .................. B60N 2/005
248/221.11
(Continued)

FOREIGN PATENT DOCUMENTS

DE  32 25 466 A1  1/1983
JP  58-144886 U  9/1983

OTHER PUBLICATIONS

U.S. Appl. No. 14/385,321, filed Sep. 15, 2014, Prin, et al.
(Continued)

*Primary Examiner* — Tan Le
(74) *Attorney, Agent, or Firm* — Oblon, McClelland, Maier & Neustadt, L.L.P.

(57) ABSTRACT

To mount a unit in a compartment in a vehicle instrument panel including an opening for inserting the unit, the unit includes two tenons that are compressible in a heightwise direction and can be guided in two fixed parallel longitudinal lateral slideways that include an entry zone and a closed-end zone that is not as tall as the entry zone in which the tenon is compressed vertically. A facade surround is provided around the opening to collaborate in positioning and/or attachment of a face plate of the unit. The lateral slideways
(Continued)

include two longitudinally separated parts, a first part secured to the facade surround and a second part not secured to the facade surround and held on a wall of the compartment of the instrument panel to lie substantially in longitudinal continuation of the first part.

14 Claims, 3 Drawing Sheets

(52) U.S. Cl.
CPC ........... *B60R 2011/0005* (2013.01); *B60R 2011/0042* (2013.01); *B60R 2011/0047* (2013.01)

(58) Field of Classification Search
USPC ........... 248/27.1, 27.3, 200.1, 224.6, 904; 361/679.33, 679.39, 747; 212/223.1, 298
See application file for complete search history.

(56) References Cited

U.S. PATENT DOCUMENTS

| | | | |
|---|---|---|---|
| 7,753,423 B2* | 7/2010 | Zellner, Jr. | B60R 13/0206 248/27.3 |
| 2004/0145208 A1 | 7/2004 | Kapteyn | |
| 2015/0034774 A1* | 2/2015 | Perveyrie | B60K 37/04 248/27.1 |

OTHER PUBLICATIONS

International Search Report issued Mar. 4, 2013, in International Application No. PCT/EP2013/051919 (with English translation).

* cited by examiner

DEVICE FOR MOUNTING A UNIT, NOTABLY A RADIO, IN A MOTOR VEHICLE INSTRUMENT PANEL COMPARTMENT

BACKGROUND

The present invention relates to a device for mounting a unit, notably a radio, in a motor vehicle instrument panel compartment.

The mounting of a radio unit in the compartment provided to this end in the instrument panel of a vehicle must make it possible to correctly fix the set in all directions. The vertical dimension may for example be given by the combination of a peg positioned at the rear of the radio unit with lateral pegs for compensating for play; the central, rear peg passes into a corresponding orifice located at the end and in the middle of the compartment. However, the increase in the number of connectors at the rear of the unit, associated with the increase in functions on the radio, makes it desirable not to have to use the rear centering peg and to ensure the vertical dimension by other means.

The document U.S. Pat. No. 5,560,572 discloses a device for mounting a unit having two parallel lateral faces on each of which there is disposed a male member or stud, the device having two superposed parallel lateral slideways that are formed in the walls of a housing recess that extends from a facade surround bordering the opening of a compartment in the instrument panel of a vehicle; the slideways form a female member or groove that is oriented in an approximately longitudinal direction and has an entry zone and an end zone less high than the entry zone; the stud has an elastically compressible part that is intended to vertically push the stud in the groove during the introduction of the stud into the narrow (low) end zone of its corresponding groove. The construction of the groove in two separate parts and of the stud likewise in two parts is relatively complicated.

According to a solution observed in vehicles of the Mercedes® brand, there exists a mounting device with a single stud on each face of the unit, produced in the form of an oval male part having an elastically squeezable indentation formed by a recess parallel to the upper edge of the part, and a single convergent groove on each side of the compartment: when each of the elastic studs is inserted into its corresponding groove, the elastic part is deformed, is squeezed elastically, and ensures Z-wise pinning of the radio, thereby making it possible normally to absorb the geometric variations of the instrument panel.

In both of the above devices, the lateral slideways that engage with the lateral studs are formed in one piece and integrally in a wall adjoining a facade mounting surround. It has been found that difficulties in mounting the radio in the compartment on account of manufacturing variations during the molding of the elements could sometimes result therefrom.

BRIEF SUMMARY

The aim of the invention is to afford an alternative mounting slideway solution which facilitates the manufacturing and the mounting of the device.

The invention achieves its aim by virtue of a device for mounting a unit in a compartment of a vehicle instrument panel having a unit insertion opening, the unit having two parallel lateral faces on each of which there is disposed a stud, the device having two fixed parallel lateral slideways that form a guided path for the studs in a substantially longitudinal direction and have an entry zone and an end zone that is less high than the entry zone, each stud having an elastically compressible part that is intended to vertically push the stud in the slideway when the stud is in the end zone of its corresponding slideway, a facade surround being provided around the unit insertion opening so as to cooperate in the positioning and/or in the fixing of a facade plate of the unit, characterized in that the lateral slideways comprise two longitudinally separated parts, specifically a first part secured to said facade surround and a second part not secured to the facade surround and held on a wall of the instrument panel compartment so as to be substantially in the longitudinal continuation of the first part.

By virtue of this disposition, the facade surround and the first slideway part, which is advantageously fairly short, can be manufactured more easily, in particular by molding a plastics material. The second part is manufactured separately and is fixed independently of the facade surround.

The device of the invention advantageously has one or more of the following features, on their own or in combination.

the first slideway part has a back wall and two convergent lips.

the second slideway part has a slot formed by an incrementally convergent upper rail and lower rail.

the second slideway part has a first, rapidly convergent section for connecting to the rear end of the first slideway part.

the second slideway part has the end zone having a height less than the free height of a stud.

the second slideway part has a lateral wall in the vicinity of the end zone.

the stud consists of a central part from which there extend two opposite symmetrical arms that each bear two lugs forming longitudinal anchors that are symmetrical with respect to the central part and are elastically compressible vertically.

the stud comprises a main body having an oval longitudinal section surmounted by two elastic fins that extend from the ends of the body and are directed along the latter, parallel thereto, toward its center.

the mounting plate of the unit has reliefs that engage with complementary reliefs provided in the mounting facade surrounding the insertion opening.

the mounting plate of the unit has fixing orifices that engage with fixing orifices provided in the mounting facade surrounding the insertion opening.

BRIEF DESCRIPTION OF THE DRAWINGS

Further features and advantages of the invention will become apparent from the following description of an exemplary embodiment. Reference will be made to the appended drawings, in which.

DETAILED DESCRIPTION

Figure 1:
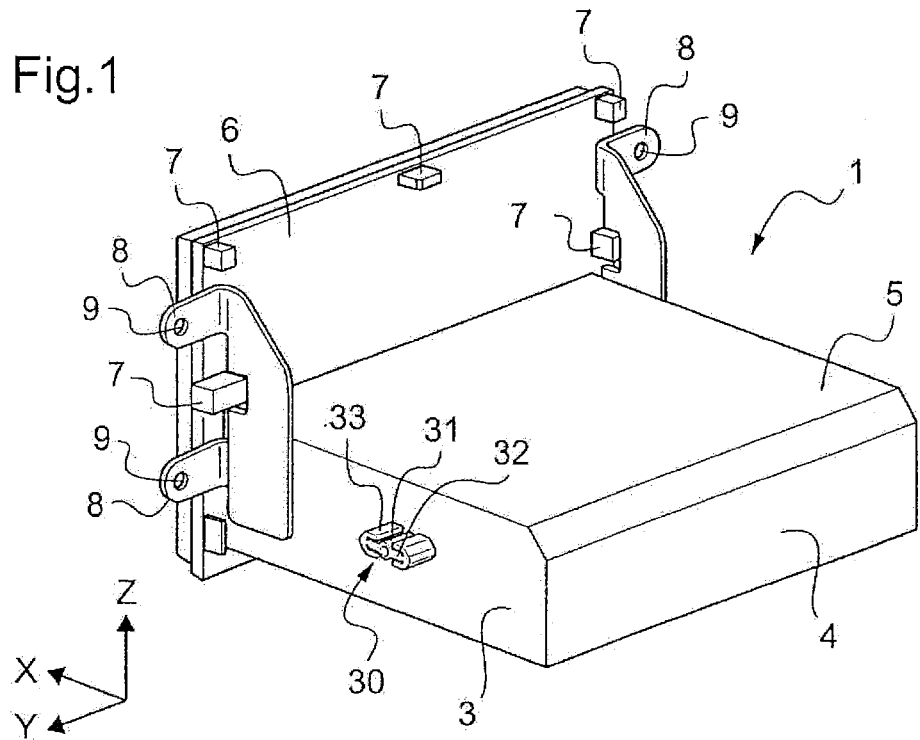
FIG. 1 is a schematic three-quarters rear perspective view of a radio set, the lateral faces of which are provided with elastic studs in accordance with the invention.

As shown in FIGS. 1 to 4, the radio unit 1 has a substantially parallelepipedal shape, with a vertical front wall 2, two vertical side walls 3, a vertical rear wall 4, a top 5 and a bottom. It will be noted that reference is made here to the front and rear of the radio unit as seen by a driver who has the radio unit in front of him when he is in the vehicle; in a traditional X, Y, Z reference frame of the longitudinal, transverse, and vertical directions, the rear of the unit 1 is in fact toward the front of the vehicle.

A front facade 6 (only shown in FIG. 1) is mounted on the front wall 2 of the unit 1. This facade comprises a plate, on the rear of which there are provided both positioning reliefs 7 and fixing lugs 8 provided with fixing holes 9.

Figure 6:
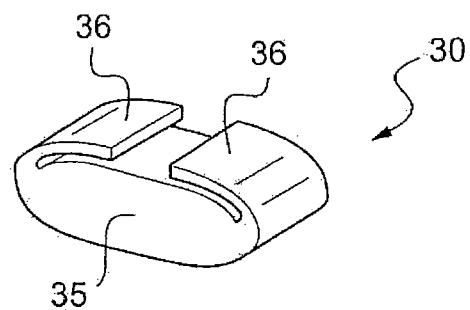
FIG. 6 is a partial perspective view of a variant of the elastic stud.

The two lateral faces 3 comprise a protruding stud 30 that is elastically compressible vertically. In this exemplary embodiment, said stud 30 has a central sleeve from which two anchors extend laterally, said anchors being formed by two diametrically opposite, longitudinal horizontal arms 32 which are each terminated by two elastic turned-back lugs 33 that are substantially parallel to the arms 32. The stud may be produced with a different shape, for example with the shape shown in FIG. 6, which comprises a main body 35 having an oval longitudinal section surmounted by two elastic fins 36 that extend from the ends of the body and are directed along the latter, parallel thereto, toward its center. In these two embodiments, the stud 30 is able to be lightly squeezed vertically and in reaction it exerts a vertical resistance force.

Figure 3:
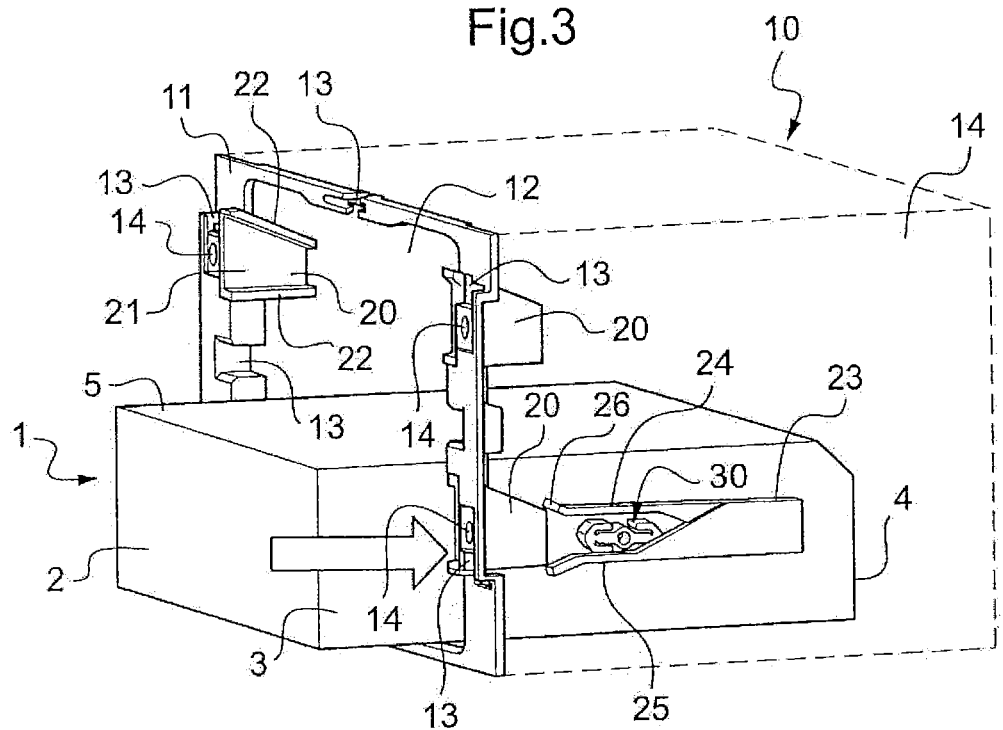
FIG. 3 is a partial three-quarters front perspective view of the radio unit and of one of the two lateral slideways of the device in accordance with the invention, during a second step in the insertion of the radio unit into the compartment.

The unit 1 is intended to be housed in a compartment 10 that is only sketched in FIG. 3 and is formed in the instrument panel of a vehicle. The compartment 10 generally has a standard size denoted 1DIN for a single volume and 2DIN for a double volume (as shown here, the unit 1 only taking up half thereof). The compartment 10 has a facade surround 11 that is intended to be slotted into or fixed in the front opening 12 in the compartment 10. The facade plate 6 of the unit is intended to be applied to this surround 11 and to be positioned and to be fixed thereon by virtue of the reliefs 7 and the fixing lugs 8. To this end, the surround 11 has recesses or hollows 13 that are complementary to the reliefs 8 to be received and holes 14 that engage with the holes 9 in the fixing lugs in order to allow fixing screws to be screwed.

Figure 5:
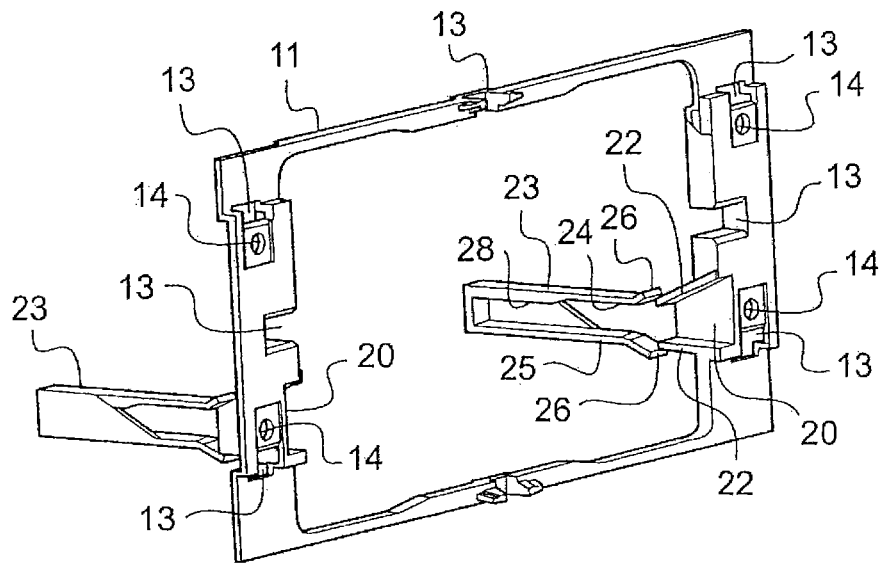
FIG. 5 is a partial perspective view of a variant of the facade surround according to the invention and of the two lateral slideways in accordance with the invention.

In accordance with the invention, the surround 11 comprises at least two first lateral slideway parts, or entry necks 20, that are disposed longitudinally toward the rear and define an advantageously short and rapidly convergent guide track for the studs 30 of the unit. Each neck 20 is formed by a back wall 21 and two convergent lips 22. In FIG. 3, the surround 11 has four necks 20, the bottom two serving to guide the unit 1 shown, and the top two being able to serve to guide a second unit positioned on top of the first. In contrast, the surround 11 in FIG. 5 has been provided with only two necks 20.

The second lateral slideway part 23 is separated from the first part 20 but is disposed longitudinally thereafter and is fixed to the lateral walls 14 of the compartment 10 by means that are not shown. The second slideway part 23 is made of one or more parts and has essentially a generally horizontal guide slot that is formed between an upper profile or rail 24 and a lower profile or rail 25. The guide slot is open laterally on the inner side of the compartment 10 but is closed on the outer side, at least in the end region of the slideway part 23. The height of the slot decreases, for example incrementally, from its entry end to its furthest away end. The rails 24, 25 have in effect a first, rapidly convergent short section 26 into which the rear end of the necks 20 can be slotted in order to ensure the continuity of the guidance. This section 26 is followed by a first section having a more or less constant or slightly convergent height, forming an entry zone for guiding the stud, said first section itself being followed by a new rapidly convergent short section 27 (only the upper rail 24 is involved here in the reduction in height of the slot, the lower rail 25 remaining horizontal once the entry section has been passed), finally followed by a new section 28 having a substantially constant or slightly convergent height, forming the end zone for compressing the stud 30.

Figure 2:
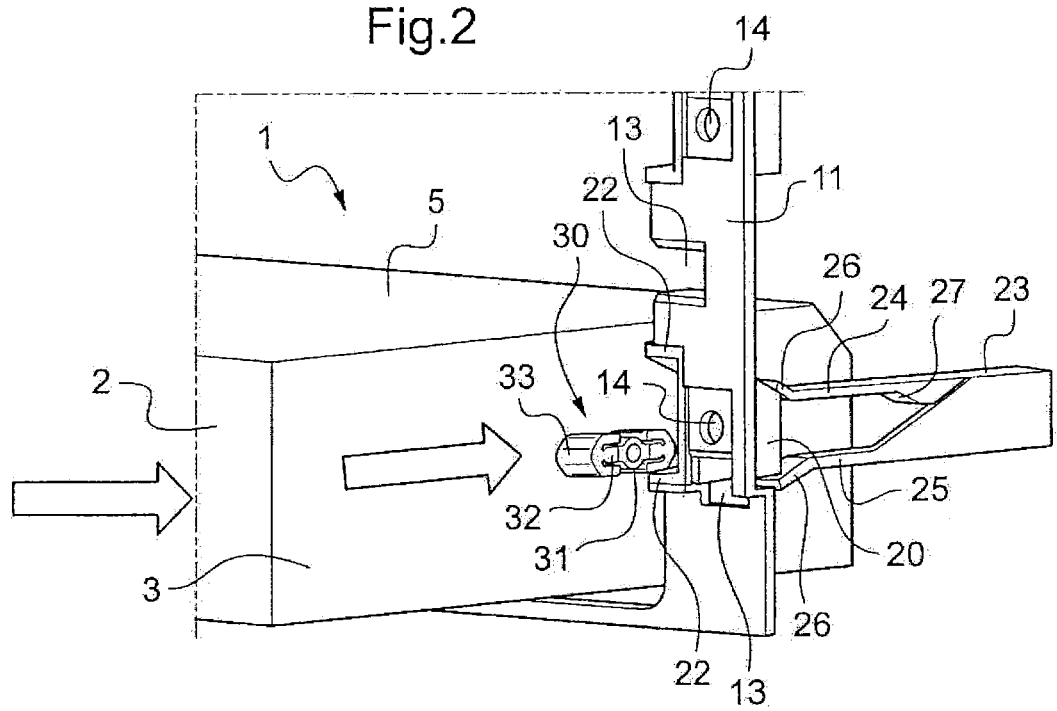
FIG. 2 is a partial three-quarters front perspective view of the radio unit and of one of the two lateral slideways of the device in accordance with the invention, during a first step in the insertion of the radio unit into the compartment.
Figure 4:
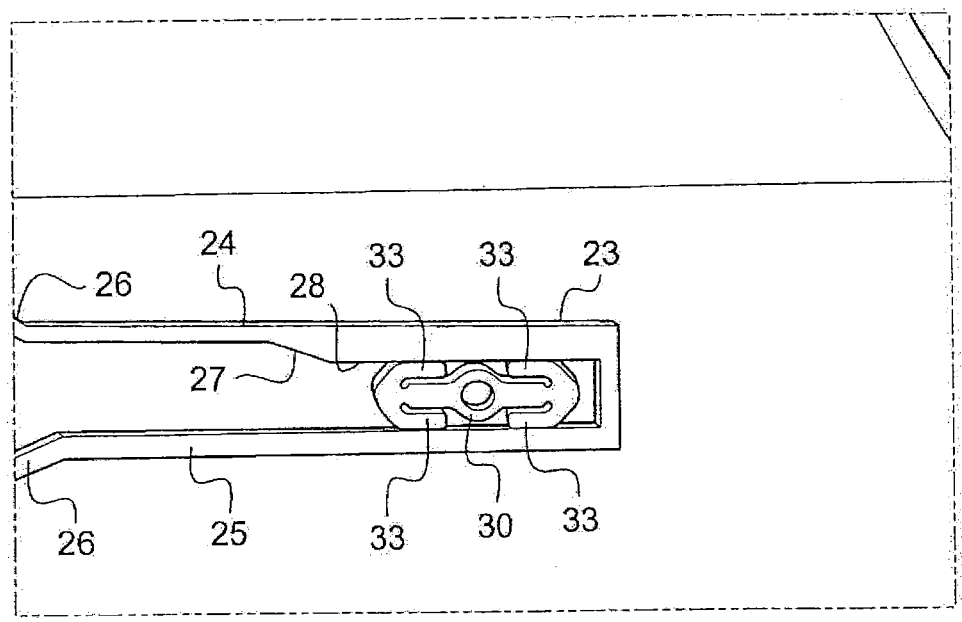
FIG. 4 is a partial side view of the elastic stud in the lateral slideway during a final step in the insertion of the radio unit into the compartment.

FIGS. 2 to 4 illustrate three steps in the introduction of the unit 1 into the housing 10 and in the engagement of the studs 30 in the horizontal slideways 20, 23.

In FIG. 2, the unit 1 is partially introduced into the compartment 10 and the stud 30 is in the phase of approaching the neck or first slideway part 20.

In FIG. 3, with the unit 1 continuing its insertion, the generally horizontal stud 30 has started to be introduced into the second, generally horizontal slideway part 23, in the first section of constant height thereof, this height being greater than the free height of the stud 30.

In FIG. 4, the stud 30 has continued to slide on the lower rail 225 of the slot 21, has passed through the highly convergent second section 27 and has reached the second section 28 of constant height, the latter having a height slightly less than the free height of the stud 30. Consequently, during the passage through the highly convergent section 27, the rails 24, 25 which narrow press against the elastic lugs 33 of the stud 30 and the height of the anchors has been able to decrease by virtue of the elasticity of the lugs 33. In one particular example, the height of the anchors may decrease by 0.5 mm on each side, or 1 mm overall. In this section 28, which is the end section of the slideway 20, 23, the unit 1 is perfectly maintained vertically by virtue of the stable pinning effected by the lugs 33 of the two anchors formed on the stud 30.

By virtue of its substantially horizontal overall shape with its ends in two elastically compressible symmetrical parts (the anchors formed by the lugs 33), the guidance of the stud 30 in its slideway 20, 23 is excellent and stable.

In order to ensure its strength and its elasticity, the stud 30 is made of a material such as a plastics material, in particular a POM (polyoxymethylene).

The invention claimed is:

1. A device for mounting a unit in a compartment of a vehicle instrument panel including a unit insertion opening, the unit including two parallel lateral faces on each of which there is disposed a stud, the device in combination with the unit, comprising:
    two fixed parallel lateral slideways that form a guided path for the studs in a substantially longitudinal direction and including an entry zone and an end zone that is less high than the entry zone;

each stud including an elastically compressible part that is configured to be vertically compressed by the slideway when the stud is in the end zone of its corresponding slideway;

a facade surround being provided around the unit insertion opening to cooperate in positioning and/or in fixing of a facade plate of the unit;

wherein the lateral slideways comprise two longitudinally separated parts, including a first part secured to the facade surround and a second part not secured to the facade surround and held on a wall of the instrument panel compartment to be substantially in longitudinal continuation of the first part.

2. The device as claimed in claim 1, wherein the first slideway part includes a back wall and two convergent lips.

3. The device as claimed in claim 1, wherein the second slideway part includes a slot formed by an incrementally convergent upper rail and lower rail.

4. The device as claimed in claim 1, wherein the second slideway part includes a first, rapidly convergent section for connecting to a rear end of the first slideway part.

5. The device as claimed in claim 1, wherein the second slideway part includes an end zone having a height less than a free height of a stud.

6. The device as claimed in claim 5, wherein the second slideway part includes a lateral wall in a vicinity of the end zone.

7. The device as claimed in claim 1, wherein the stud comprises a central part from which there extend two opposite symmetrical arms that each bear two lugs forming longitudinal anchors that are symmetrical with respect to the central part and are elastically compressible vertically.

8. The device as claimed in claim 1, wherein the stud includes a main body including an oval longitudinal section surmounted by two elastic fins that extend from the ends of the body and are directed along the body, parallel thereto, toward its center.

9. The device as claimed in claim 1, wherein the facade plate of the unit includes reliefs that engage with complementary reliefs provided in the mounting facade surrounding the insertion opening.

10. The device as claimed in claim 1, wherein the facade plate of the unit includes fixing orifices that engage with fixing orifices provided in the mounting facade surrounding the insertion opening.

11. The device as claimed in claim 7, wherein the facade plate of the unit includes reliefs that engage with complementary reliefs provided in the mounting facade surrounding the insertion opening.

12. The device as claimed in claim 7, wherein the facade plate of the unit includes fixing orifices that engage with fixing orifices provided in the mounting facade surrounding the insertion opening.

13. The device as claimed in claim 8, wherein the facade plate of the unit includes reliefs that engage with complementary reliefs provided in the mounting facade surrounding the insertion opening.

14. The device as claimed in claim 8, wherein the facade plate of the unit includes fixing orifices that engage with fixing orifices provided in the mounting facade surrounding the insertion opening.

* * * * *